United States Patent
Bentley et al.

(10) Patent No.: US 12,386,326 B2
(45) Date of Patent: Aug. 12, 2025

(54) OVEN HAVING AN AUTOMATIC SELF-CLEANING SYSTEM

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US); Stefan Wrehde, Nußdorf (DE)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 373 days.

(21) Appl. No.: 17/740,395

(22) Filed: May 10, 2022

(65) Prior Publication Data

US 2023/0367275 A1 Nov. 16, 2023

(51) Int. Cl.
*G05B 19/042* (2006.01)
*F24C 14/02* (2006.01)

(52) U.S. Cl.
CPC ............ *G05B 19/042* (2013.01); *F24C 14/02* (2013.01); *G05B 2219/2643* (2013.01)

(58) Field of Classification Search
CPC .......... G05B 19/042; G05B 2219/2643; F24C 14/00; F24C 14/02; F24C 14/005; F24C 7/085; F24C 15/003
See application file for complete search history.

(56) References Cited

U.S. PATENT DOCUMENTS

| | | | |
|---|---|---|---|
| 5,286,943 A | 2/1994 | Has | |
| 6,462,319 B1 * | 10/2002 | Uy | H05B 6/6405 219/400 |
| 6,784,404 B2 | 8/2004 | Meyer | |
| 9,677,769 B2 | 6/2017 | Laessig | |
| 9,717,384 B2 * | 8/2017 | Ham | A47L 9/2868 |
| 2002/0005401 A1 * | 1/2002 | Meyer | F24C 7/085 219/393 |
| 2002/0014480 A1 * | 2/2002 | Corda | F24C 14/02 219/490 |
| 2012/0095606 A1 * | 4/2012 | Besore | A47L 15/0047 700/291 |
| 2013/0199511 A1 * | 8/2013 | Laessig | F24C 14/00 126/369 |
| 2014/0207282 A1 * | 7/2014 | Angle | H04L 12/2809 901/1 |

(Continued)

FOREIGN PATENT DOCUMENTS

WO 2019038011 A1 2/2019

*Primary Examiner* — Nicholas Klicos
(74) *Attorney, Agent, or Firm* — Michael E. Tschupp; Andre Pallapies; Brandon G. Braun

(57) ABSTRACT

A method for cleaning an oven may include automatically scheduling a cleaning event to occur during a period of user inactivity, by an electronic controller of an oven, based on an estimated cumulative soiling level and a predicted period of user inactivity. In this context, the cleaning event includes one or more automatic activities configured to clean an interior cavity of the oven. A user is notified of the scheduled cleaning event, by the electronic controller, and the cleaning event is executed automatically. Other smart home components (e.g., ventilation, windows, and/or doors) may be repositioned automatically to facilitate the event.

21 Claims, 7 Drawing Sheets

(56) References Cited

U.S. PATENT DOCUMENTS

| | | | |
|---|---|---|---|
| 2015/0285620 A1* | 10/2015 | Menn | G01N 21/55 |
| | | | 165/95 |
| 2017/0082295 A1* | 3/2017 | Faraldi | F24C 14/005 |
| 2018/0340693 A1* | 11/2018 | Bauer | F24C 7/085 |
| 2019/0049979 A1* | 2/2019 | Brede | G05D 1/0219 |
| 2019/0093901 A1* | 3/2019 | Weber | F27D 21/02 |
| 2020/0367692 A1 | 11/2020 | Stipe | |
| 2021/0095860 A1* | 4/2021 | Kraus | F24C 14/005 |

\* cited by examiner

COOKING PROGRAM: *T-Bone steak*

| Options: | Target cooking temperature range: |
|---|---|
| Rare | |
| Medium-rare | 125F-165F |
| Medium | |
| Medium-well | |
| Well done | |

Soiling factor: 4

COOKING PROGRAM: *Lasagna*

| Options: | Target cooking temperature range: |
|---|---|
| Normal | |
| Crispy | N/A |
| Extra Crispy | |

Soiling factor: 7

COOKING PROGRAM: *Bacon*

| Options: | Target cooking temperature range: |
|---|---|
| Soft | |
| Medium | N/A |
| Crispy | |
| Extra Crispy | |

Soiling factor: 10

FIG. 3

| Time of Day | Monday | Tuesday | Wednesday | Thursday | Friday | Saturday | Sunday |
|---|---|---|---|---|---|---|---|
| 0-3 | | | | | | | |
| 3-6 | | | X | | | | X |
| 6-9 | | | | | | X | X |
| 9-12 | | | | | | | X |
| 12-15 | X | X | | X | | | O |
| 15-18 | | | X | | X | X | X |
| 18-21 | | O | | | O | O | |
| 21-24 | | | | | | | |

X – indicates typical use times
O – indicates occasional use times

FIG. 4

OVEN HAVING AN AUTOMATIC SELF-CLEANING SYSTEM

FIELD

This disclosure relates to systems and methods for self-cleaning oven systems. More specifically, the disclosed embodiments relate to an autonomous self-cleaning system for use with residential ovens.

INTRODUCTION

Many at-home chefs neglect keeping the interior surfaces of their oven clean for a variety of reasons. A dirty oven cavity is often the result of a spill or splattering occurring in the oven during a cooking process. This soiling of the oven interior is often discovered only when the odor of burning food is detected during a subsequent preheating of the oven. While the burning odor may be annoying, soiling of the oven interior over time can also reduce the cooking performance of the oven.

Most cleaning methods today are manually activated, requiring a user to decide when it is best to clean the oven. Furthermore, leaving splatters, spills, overflows, and/or food debris on an interior surface of the oven for extended periods of time often results in these soils becoming "baked-in" or "baked on," making them much harder to remove. This then requires more cleaning time and often a harsher cleaning process. Because the oven cavity is not readily visible, and because it is human nature to put off tasks like oven cleaning, leaving it entirely in the user's discretion increases the likelihood of a large amounts of accumulated soiling between cleaning events.

SUMMARY

The present disclosure provides systems, apparatuses, and methods relating to an autonomous self-clean system for an oven.

In some embodiments, a method of the present disclosure, for cleaning an oven, may include: automatically scheduling a cleaning event to occur during a period of user inactivity, by an electronic controller of an oven, based on an estimated cumulative soiling level and a predicted period of user inactivity, wherein the cleaning event comprises one or more automatic activities configured to clean an interior cavity of the oven; notifying a user of the scheduled cleaning event, by the electronic controller; and executing the cleaning event automatically.

In some embodiments, an autonomous self-cleaning oven of the present disclosure may include: an oven body having an oven cavity configured to be selectively heated by one or more heating elements; an electronic controller configured to control the one or more heating elements and having processing logic configured to: track an estimated cumulative soiling level of the oven cavity; automatically schedule an oven cleaning event to occur during a period of user inactivity, based on the estimated cumulative soiling level and a predicted period of user inactivity; notify the user of the scheduled cleaning event; and automatically execute the cleaning event.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 depicts illustrative cooking programs suitable for use with ovens of the present disclosure.

FIG. 4 is an illustrative schedule of observed usage in accordance with aspects of the present disclosure.

DETAILED DESCRIPTION

Figure 1:
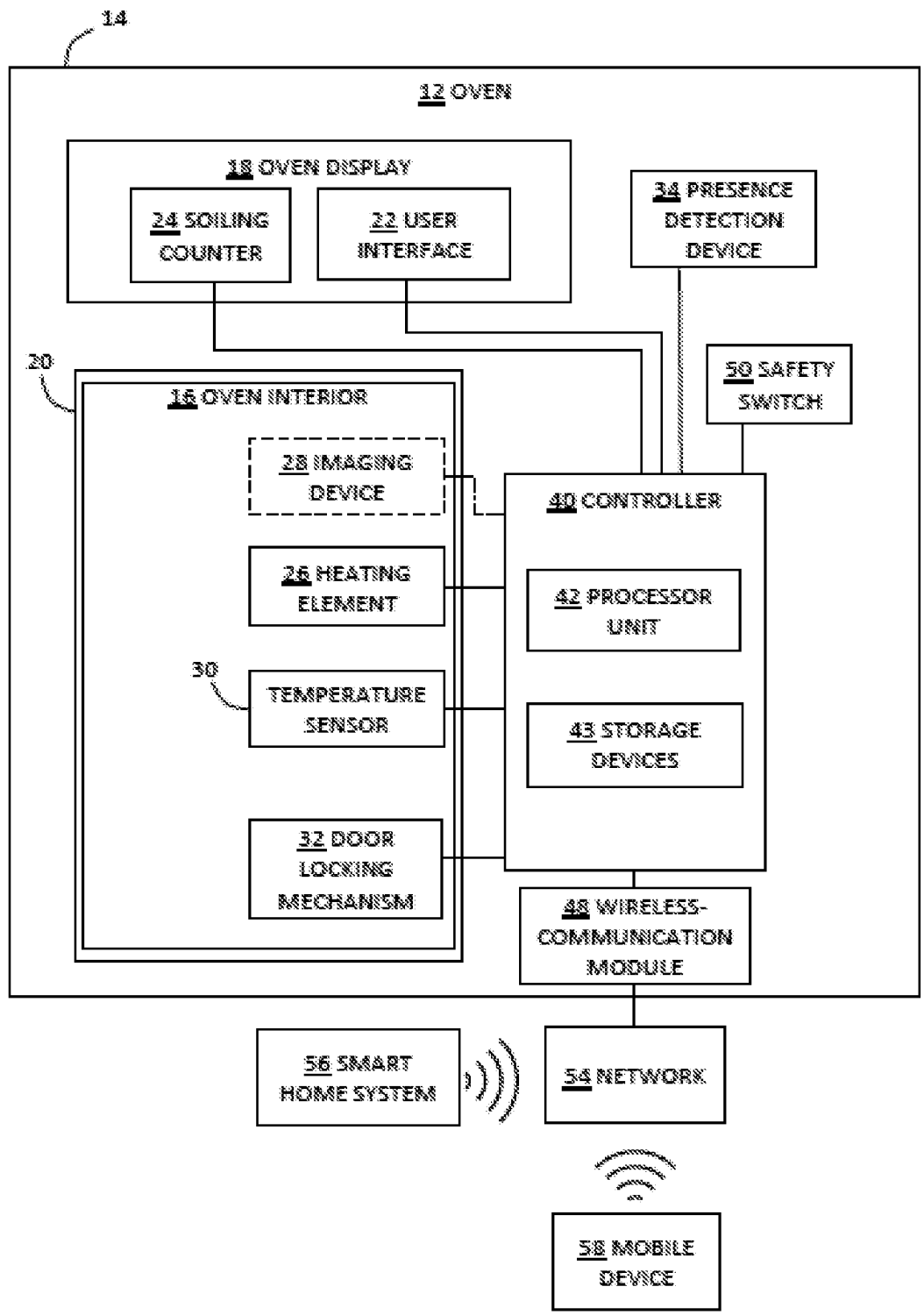
FIG. 1 is a schematic block diagram of the operational environment of an autonomous self-cleaning system in accordance with aspects of the present disclosure.

Various aspects and examples of an autonomous self-cleaning system for use with an oven, as well as related systems and methods, are described below and illustrated in the associated drawings. Unless otherwise specified, an autonomous self-clean system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, autonomous self-cleaning systems of the present disclosure facilitate convenient and regular cleaning of interior surfaces of an oven cavity. These systems may utilize smart home technology (e.g., a "smart oven") to incorporate cleaning of the oven that accommodates a daily routine of the user and makes oven cleaning an automated task handled by the appliance. A smart oven may be capable of connecting to a mobile device and/or computer network. The cleaning system utilizes an onboard computer of the smart oven, a network connection, and/or connectivity to a mobile device to collect data about the user. By collecting time-based data about the user, the cleaning system learns the user's activity and schedule, such that the oven may recognize idle time between cooking events that also avoids interfering with the user's normal activities. This idle time may be appropriate for oven cleaning, and the system therefore schedules appropriate cleaning events to occur during those idle periods.

The cleaning system utilizes data collection and machine learning to enable the oven to learn user activity and recognize periods of time when the oven is and is not used. By learning user activity relative to the oven, the cleaning system is better able to schedule a cleaning event that does not conflict with the normal use of the oven. Data concerning user activity may be collected by the cleaning system using one or more of a plurality of techniques. In some examples, the cleaning system utilizes presence detection device (e.g., a proximity sensor disposed on an exterior of the oven). The presence detection device may be in the form of one or more presence, motion, and/or activity sensors configured to track when a user is in close proximity to, and/or using the oven. The presence detection device communicates observation data to a data processing system of the oven. The transmission of observational data may be through a hard-wired connection and/or a wireless connection.

The observation data relating to user presence is used by processing logic (e.g., including a machine learning (ML) model) configured to identify periods of time when the user is least likely to use the oven, for the purpose of scheduling a cleaning event. In some examples, user data is collected from a mobile device of the user connected to a network, in which cases the cleaning system may collect data such as the user's schedule and location to determine the daily routines. In some examples, the cleaning system may utilize the data collected from the presence detection device and the data collected from the user's mobile device to better learn and determine when the user is least likely to use the oven.

When possible, cleaning events may be scheduled by the system on the same day that the oven has been used. By taking into account the data collected from the presence detection device and/or the data collected from the user's mobile device, the oven determines (based on known cooking habits) an acceptable time to run the cleaning event. If the user does not want the scheduled cleaning event to occur, the user may at any time use the user interface, a smart home hub, an associated mobile device application, and/or any other suitable device to cancel or pause the scheduled cleaning event. Alternatively, the user may provide scheduling information regarding when cleaning events are permitted.

The cleaning system may comprise a variety of cleaning program options that utilize different cleaning methods depending on an estimated soil level. For instance, the cleaning system may utilize cleaning programs such as a pyrolysis program (commonly called "self clean") for large amounts of dirt and soiling, and an additive steam/water vapor program and/or a detergent and water spray program for smaller amounts of dirt and soiling. In specific cases the system may require a manual cleaning program to be performed by a human. The cleaning system may incorporate any cleaning program deemed necessary into the scheduled cleaning event.

In some examples, the oven may further be equipped with automated cooking programs (AKA recipe cards) for various common food items. In examples where the oven has the capability to cook using automated programs, the cleaning system may use data collected from the automated cooking programs to determine when a cleaning event is needed. The automated cooking programs may be associated with a packet of information comprising a variety of factors such as estimated cooking time, target interior temperature of a food item, appropriate cooking methods, and other important information relating to the food item. Such programs may further include information relating to an estimated likelihood of the soiling (i.e., splatter, spillage, etc.) of the oven interior based on the food item and cooking method. This estimated likelihood of soiling is herein termed a soiling factor and may be tabulated to determine when a cleaning event is likely to be needed. The oven when using the automated cooking programs may log the soiling factor and cooking style of a food item as part of a cooking event.

In between cleaning events, the soiling factor of each cooking event that has occurred is added together to create a total soiling score which is displayed using a soiling counter. The soiling counter may be disposed on an exterior surface of the oven such that it is visible to the user. In some examples, once the total soiling score reaches or exceeds a predetermined threshold associated with a need to clean the oven interior, a cleaning event is scheduled by the cleaning system. After each successful cleaning event the soiling counter is reset to zero. In examples where a food-item has a high likelihood of soiling the interior of the oven, such as bacon, the cleaning system may schedule a cleaning event after one use. In cases where the food item or cooking method has a low likelihood of soiling the interior of the oven such as cooking in a closed container (i.e., using a dutch-oven casserole dish, etc.), the cleaning system may log the cooking event toward the soiling counter. In some examples, the cleaning system may schedule a cleaning event to take place in response to a certain accumulated number of cooking events and/or if the total cooking time accumulated between cleaning events reaches or exceeds a threshold. In such examples the cleaning event may be scheduled regardless of the total soiling score displayed by the soiling counter.

The oven may be equipped with a soiling detection device configured to detect the presence of soils inside an oven cavity. The soiling detection device may include any suitable device configured to determine (directly or indirectly) a level of interior oven soiling. In some examples, the soiling detection device includes a camera configured to view the interior of the oven. The camera or imaging device may be utilized by the cleaning system to identify or supplement data regarding whether there is a need for a cleaning event. For example, the imaging device may be used to take an initial image of a clean oven interior to produce a clean baseline for use with an image analyzer. The imaging device may then be used after each (or a selected) cooking event to image the oven for comparison to the clean baseline. The image analyzer may be used to compare the two images and identify differences between them, such as food debris, grease buildup, or other soilings. In cases where the image analyzer detects a soiling of the oven interior, the cleaning system may schedule a cleaning event and/or increment the estimated soiling level.

In some examples, the soiling detection device includes a (non-imaging) sensor configured to measure a characteristic associated with soiling, and to detect a change in that characteristic that indicates soiling has occurred. For example, the soiling detection device may include an electrical resistance sensor configured to detect the electrical resistance of the oven cavity floor, walls, and/or other interior surfaces. Based on the assumption that this resistance changes when foreign substances are present on the cavity surface, the estimated soiling level can be supplemented and/or determined. In some examples, the soiling detection device is configured to track the effective heating performance of the oven, and to infer the presence of soiling within the oven when oven heating performance changes or dips below an expected level.

The cleaning system may further include a safety program that may utilize a series of components to minimize the risk of appliance, user, or home damage. As part of the safety program, the imaging device may scan the oven interior prior to a cleaning event so as to detect any items present in the oven interior that are not compatible with the scheduled cleaning event. Some examples of such items that often need to be removed from an oven include, pans stored in the oven after use and food items left forgotten in the oven after cooking. Furthermore, in the event that a cleaning event is scheduled to occur, but a scan reveals that racks or other oven components are not compatible with the type of cleaning program (i.e., pyrolytic cleaning program) scheduled, the cleaning event will be postponed and a notification will be sent to the user. In such cases, the notification will alert the user that a cleaning is recommended but cannot occur due to a reason identified by the appliance (i.e., noncompatible item in oven). The safety program, once ensuring that no non-compatible items remain inside the oven, engages a door lock arranged inside the oven cavity such that it may firmly secure an oven door over the oven cavity. The door lock is configured to prevent an opening of the oven during a cleaning event. The safety program of the cleaning system may incorporate other additional features such as safety switch configured to shut off power to the oven if the cavity temperature gets to hot.

One aspect of oven cleaning processes often found annoying is the resulting release of negatively perceived odors. This annoyance can often be resolved by opening a window or activating a kitchen ventilation system to release the odors from the kitchen. It is also often recommended that closing a kitchen door will help ensure that the odors don't spread to the rest of the house. As such, the autonomous self-cleaning system may further be capable of communicating with other network connected appliances, devices, and/or systems within the home, in order to execute tasks deemed necessary such as opening a window, closing a door or turning on a ventilation system, etc.

Aspects of the autonomous self-cleaning system may be embodied as a computer method, computer system, or computer program product. Accordingly, aspects of the autonomous self-cleaning system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the autonomous self-cleaning system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the autonomous self-cleaning system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the autonomous self-cleaning system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the autonomous self-cleaning system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of an illustrative autonomous self-cleaning system as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Autonomous Self-Cleaning System

Figure 2:
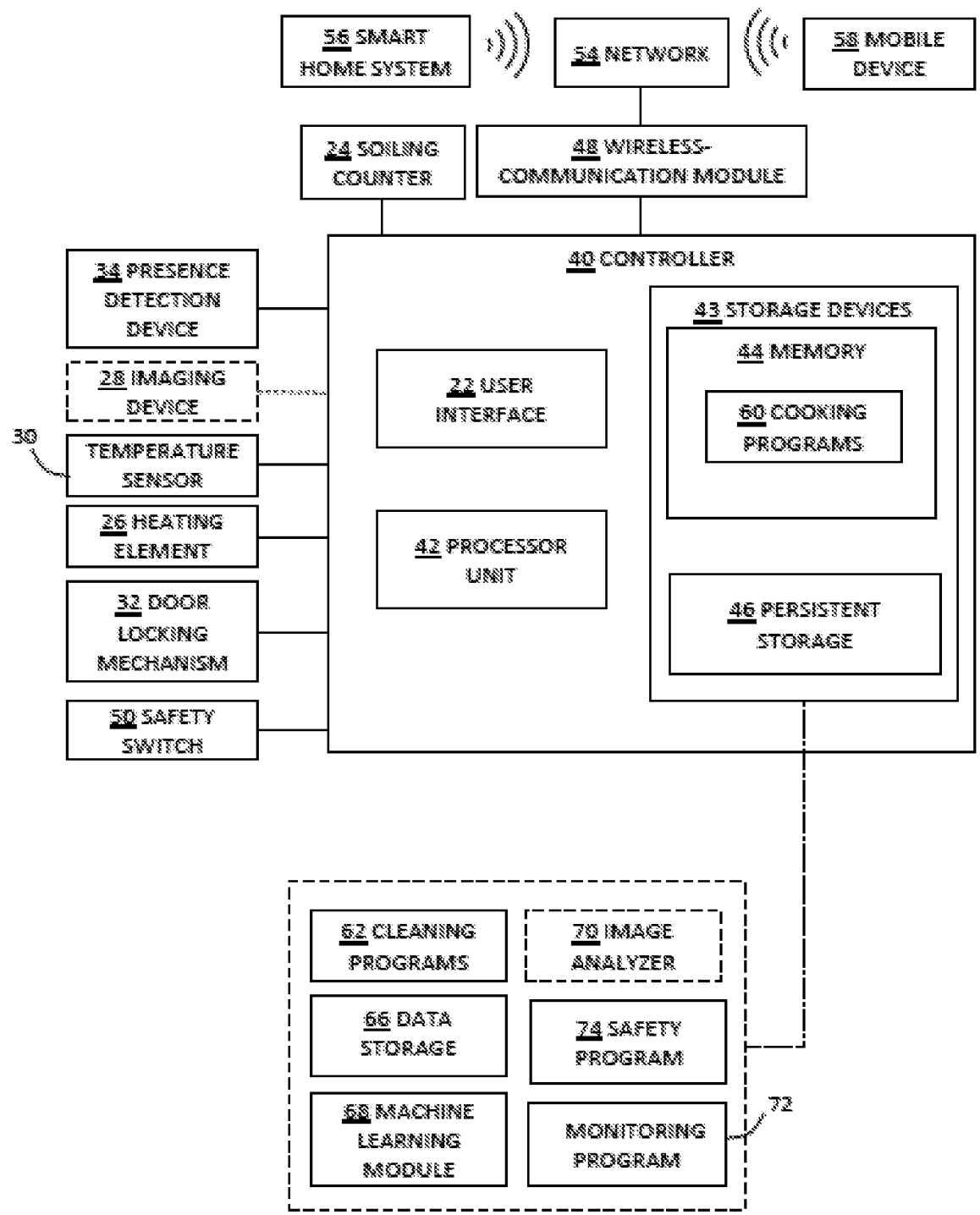
FIG. 2 is a schematic block diagram of components of the autonomous self-cleaning system of FIG. 1.

As shown in FIGS. 1-2, this section describes an operational environment of an autonomous self-cleaning system 10 (e.g., including a smart cooking appliance and related components) for facilitating convenient regular (e.g., daily or weekly) oven interior cleaning. The autonomous self-cleaning system 10 is an example of the autonomous self-cleaning systems described in the Overview above.

Cleaning system 10 includes a plurality of data collecting devices (sensors, etc.) configured to collect and transmit a variety of observational data to an electronic controller 40 configured to control and manage systems of an oven 12. Observational data transmitted to electronic controller 40 may include user and/or object presence, oven cavity temperature, internal temperature of food, soiling level of surfaces, and other types of useful data. These data collecting devices may be arranged with respect to oven 12 in any manner suitable to obtain accurate readings. Oven 12 with an arrangement of data collecting devices is depicted in FIG. 1. In the current example, oven 12 of FIG. 1 includes an oven body 14 having an oven display 18 and an oven cavity (AKA oven interior) 16. The oven cavity is accessed through an opening arranged on a front lower surface of oven body 14. An oven door 20 may be coupled to oven body 14 by a hinge or other fastener and configured to selectively cover the opening of oven cavity 16. Oven display 18 may be arranged on a front upper surface of the oven body (or any other suitable location), such that the display is easily visible to a user.

Oven 12 may optionally operate using a variety of cooking programs 60 to cook food items. Cooking programs 60 may be associated with a packet of information comprising a variety of factors such as estimated cooking time, target interior temperature of a food item, appropriate cooking methods, and other information relating to the food item to be prepared. In the current example, cooking programs 60 further include information relating to an associated oven soiling estimate (e.g., an estimated likelihood of the soiling (i.e., splatter, spillage, etc.) of the oven interior) based on the food item and cooking method. This estimated likelihood of soiling is referred to as a "soiling factor." Over time, the soiling factors associated with actual usage of the oven cooking programs may be tabulated (e.g., along with other relevant information) to determine when a cleaning event is advisable or likely to be needed.

Oven display 18 may include a control panel (AKA user interface) 22 that supports a variety of control features configured to communicate with electronic controller 40 to regulate a variety of elements and systems of oven 12. These control features may include one or more control knobs, buttons, switches, screens, and/or touch-pads. User interface 22 is configured to allow the user to set and adjust certain functions of the oven, including but not limited to features of cooking programs 60 and/or a cleaning program 62. The oven display may also include a soiling counter 24 configured to display to the user a numerical or other visual value, determined by autonomous self-cleaning system 10, representing the estimated cumulative amount of soiling in oven cavity 16.

Cleaning system 10 includes the control and management of various cleaning programs 60 that utilize different cleaning methods, depending on an estimated soil level of oven cavity 16. For instance, cleaning system 10 may utilize a pyrolysis cleaning program for large amounts of soiling, and an additive steam/water vapor cleaning program and/or a detergent and water spray cleaning program for smaller amounts of soiling. In some cases, cleaning system 10 may recommend a manual cleaning program to be performed or supervised by a user.

In examples where oven 12 is configured to utilize the water-based and/or detergent-based cleaning programs, an amount of water and/or detergent may be stored in the oven and proportioned out by cleaning system 10 based on cleaning program 60. In the event that levels of the stored water and/or detergent are low, such that a scheduled cleaning event is prevented from successfully occurring, cleaning system 10 will send a notification to the user's mobile device 58, smart home hub 78 and/or display a notification on a user interface 22 (e.g., arranged on the exterior of oven 12). Cleaning system 10 may incorporate any suitable cleaning program 60 into a scheduled cleaning event.

Electronic oven controller 40 is configured to control and manage operation of oven 12. The controller is operatively coupled to a variety of sensors and other components for collecting data and executing systems of oven 12. In the current example, user interface 22 is configured to provide inputs, commands, and instructions to oven controller 40, such as the user's selection of desired oven cavity temperature, postponement of a cleaning event, and/or a selection from cooking programs 60. Controller 40 includes processing logic, such as one or more processors 42 configured to process inputs, commands, and/or instructions to control the operation of a variety of components of oven 12, such as a presence detection device 34, a heating element 26, a temperature sensor 30, an imaging device 28, a door locking mechanism 32, a safety switch 50, and/or soiling counter 24. Controller 40 is coupled to soiling counter 24, such that when the controller receives information representing the end of a cooking and/or cleaning program, the controller in turn updates the total soiling score displayed by the soiling counter.

Controller 40 may include one or more storage devices 43 such as a memory 44 and a persistent storage 46 for storing computer-readable media. Memory 44 and persistent storage 46 are examples of storage devices 43 and include hardware configured to store information such as data, program code, system instructions and/or other suitable information, either temporarily or permanently. The storage devices of controller 40 are utilized to store information relating to the operation of the oven and implementation of the autonomous self-cleaning system 10. In the current example, storage devices 43 are configured to store information and code relating to the operation of oven 12 and cleaning system 10, such as cooking programs 60, cleaning programs 62, a safety program 74, a monitoring program 72, an image analyzer 70, and a machine learning model 68. Storage devices 43 are configured to store data 66 as well as other information relating to the operation of oven 12.

Oven 12 includes one or more heating elements 26 configured to heat the oven cavity (e.g., in accordance with a selected cooking program 60 and/or cleaning program 62). Heating elements 26 may be disposed in any location relative to oven 12 that facilitates heating of oven cavity 16, such as within the oven cavity, underneath a floor of the oven cavity, and/or in a peripheral wall of the oven. Heating element 26 is operatively coupled to controller 40, such that the controller is configured to selectively control the operation of the heating elements during cooking and/or cleaning events. Oven 12 may further include one or more temperature sensors 30 operatively coupled to electronic controller 40 to provide input. In the current example, temperature sensors include a thermometer or other temperature sensor disposed within oven cavity 16. In some examples, temperature sensor 30 is disposed on or in an interior wall or surface of oven cavity 16. One or more temperature sensors 30 may be located at any location configured to facilitate recording accurate temperature measurements of oven cavity 16 and/or any contents within the oven cavity. Temperature sensors 30 include at least one sensor configured to measure the internal oven temperature during cooking and/or cleaning. In some examples, temperature sensors 30 further include a food temperature sensor configured to measure the internal temperature of one or more food items present inside the oven cavity. Temperature sensors may include one or more thermistors, infrared temperature sensors, probes, and/or any other suitable devices. Controller 40 utilizes data from temperature sensors 30 to determine whether oven controls and heating elements 26 should be adjusted or completely shut off.

Oven cavity 16 may be provided with a soiling detection device configured to determine an amount of soiling accumulated within the oven cavity. In the current example, the soiling detection device includes an imaging device 28 (e.g., a camera) configured to produce images of the oven interior. Images of the interior surfaces of the oven cavity, objects within the oven cavity, and/or soiling within the cavity may be analyzed using image analyzer 70 to estimate soiling levels, identify objects and/or food items, etc. Imaging device 28 may be mounted to one or more interior surfaces of oven cavity 16. In some examples, imaging device 28 includes a camera configured to take comprehensive digital images and/or scans of the interior surfaces of oven cavity 16. Together, imaging device 28 and image analyzer 70 are utilized by cleaning system 10 as a basis to determine whether a cleaning event is recommended between cooking events. Imaging device 28 may be used to take an initial scan of the interior surfaces of a clean oven cavity 16 to produce a baseline for use by image analyzer 70. Imaging device 28 may be used after each cooking and/or cleaning event to produce a post-event image that can be compared to the clean baseline. In the current example, image analyzer 70 compares the clean baseline and post-event images and identifies differences between them. These differences may include additional food debris, grease buildup, and/or other soiling. Based on the analysis, image analyzer 70 sends information to controller 40 to schedule a cleaning event or to supplement other information relating to cumulative soiling.

In some examples, cleaning system 10 may determine a need for cleaning based on observed data, such as the number of observed cooking events and the accumulated cooking time between cleaning events. In examples where cleaning system 10 utilizes a number of cooking events to determine a need for cleaning, the cleaning system determines a total cooking event threshold to represent a need for cleaning. The cleaning system using this method monitors usage of oven 12 and logs each cooking event as it occurs. In some examples, the same concept may be utilized, but with a counter starting at a selected number and counting down toward zero. A cleaning event would then be scheduled when the counter runs out. Similarly, in examples were cleaning system 10 utilizes the total amount of cooking time accumulated, the cleaning system uses a threshold that represents a need for cleaning. Cleaning system 10 in such an example collects the total cook time after every cooking event and tallies or aggregates the times together. Alternatively, each cooking event may subtract the cooking time from a running total that begins at a selected amount and increments down toward zero.

In some examples oven 12 includes a door locking mechanism 32 configured to selectively secure oven door 20 in a closed and locked configuration over oven cavity 16. Door locking mechanism 32 may include hooks or fasteners disposed on an interior surface of oven door 20 and a slot or receiver disposed on a front surface of oven body 14 or along a peripheral edge of the oven cavity 16. Oven 12 may include additional safety features in addition to locking mechanism 32, such as a position sensor or switch configured to sense an orientation or position of door, and signal electronics controller to halt a heating operation or cleaning program in the event that oven door 20 and oven cavity 16 are misaligned.

In the current example, controller 40 implements a safety program 74 utilizing a variety of oven components to reduce the risk of appliance, user, or home damage and/or discomfort. Safety program 74 comprises a series of safety measures that utilize a variety of components operatively coupled to and controlled by controller 40. As part of safety program 74, imaging device 28 may scan the interior of oven cavity 16 prior to a cleaning event, so as to detect any items present in the oven cavity that are incompatible with the scheduled cleaning event (e.g., pans stored in the oven after use and food items left forgotten in the oven after cooking). If a cleaning event is scheduled to occur, but the safety scan reveals something incompatible with the type of cleaning program 62 (i.e., pyrolytic cleaning program) scheduled, the cleaning event will be postponed and a notification will be sent to the user. In such cases, the notification alerts the user that a cleaning is recommended but cannot occur due to a reason identified by oven 12 (i.e., noncompatible item in oven). Furthermore, safety program 74, when no incompatible items are detected within oven cavity 16, engages door locking mechanism 32 to firmly secure door 20 during the cleaning program execution.

Power to heating elements 23 of oven 12 and cleaning system 10 may be routed through a safety switch 50, such as a bi-metal thermal switch. Safety switch 50 may be mechanically fixed to a specific temperature range which cannot be changed or overridden by remote hacking. Safety switch 50 ensures that in the event where oven temperatures exceed a specified safety limit, all power to the heating and cleaning components of oven 12 are automatically be switched off. This arrangement minimizes the risk that the oven during a cooking or cleaning event may go into a "runaway" condition, where it poses a risk of starting a fire or creating damage to the appliance, user, or home.

Furthermore, oven 14 may include a wireless-communication module 48 coupled to controller 40. Wireless-communication module 48 comprises hardware configured to connect to a network 54, mobile device 58, smart home hub 78, and/or a smart home system 56. In the current example, cleaning system 10 utilizes wireless-communication module 48 coupled to controller 40 to collect data from mobile device 58 and/or smart home hub 78 and execute system commands to other devices incorporated in smart home system 56.

In some examples, cleaning system 10 is configured to communicate with other network connected appliances, devices, and/or systems within the home, such as smart home system 56, in order to execute selected tasks. Such network connected appliances, devices, or systems may include a smart window and/or door monitoring system, automatically operated windows and/or doors, and a kitchen ventilation system. In some examples, the kitchen ventilation system is accessible to cleaning system 10, such that the cleaning system may activate the ventilation system before beginning a cleaning event to ensure the removal of odors and/or smoke from the kitchen. In other examples, smart home system 56 may include automatically operated doors and/or windows connected to network 54, in which case cleaning system 10 may automatically open a kitchen or household window and/or close a kitchen door. Furthermore, in cases where cleaning system 10 does not have the capability to control these appliances, devices, or systems, but may monitor them, the cleaning system will check to make sure that all are in an appropriate state (on/off/open/closed/etc.) before beginning a cleaning event.

In some examples, cleaning system 10 will consider the appropriate state of appliances to include a closed kitchen door, open windows, and an activated ventilation system. Before beginning a cleaning event cleaning system 14 will check and adjust any connected appliances. If one or more of the appliances, devices, or systems are not in the appropriate state, and cleaning system 10 does not have control of said appliances, the cleaning system may postpone a cleaning event until the next available opportunity. When a cleaning event is postponed for such reasons, cleaning system 10 may send a notification to the user alerting them that a scheduled cleaning event has been postponed and advise them on steps that need to be taken for the cleaning event to occur.

Cleaning system 10 utilizes monitoring program 72, data collection, and machine learning to enable the oven to learn user activity and recognize periods of time when the oven is not used. In the current example, cleaning system 10 via controller 40 implements a monitoring program 72 which uses presence detection device 34 to track the presence of a user near the oven and/or kitchen and record the date and time of every observed usage. Presence detection device 34 is positioned such that it can easily detect the presence of the user and/or any other humans or pets the areas surrounding the oven and/or the entire kitchen. Monitoring program 72 in connection with presence detection device 34 is utilized by system 10 to collect and organize data regarding usage of the oven and/or kitchen. This data may be organized into a chart representing a schedule of the user's observed presence near the oven and/or kitchen. Although this charting is convenient for human review of the data, any analogous organization and/or analysis of the data may be utilized by system 10 to determine downtimes. An example schedule of observed usage is depicted in FIG. 4.

Figure 5:
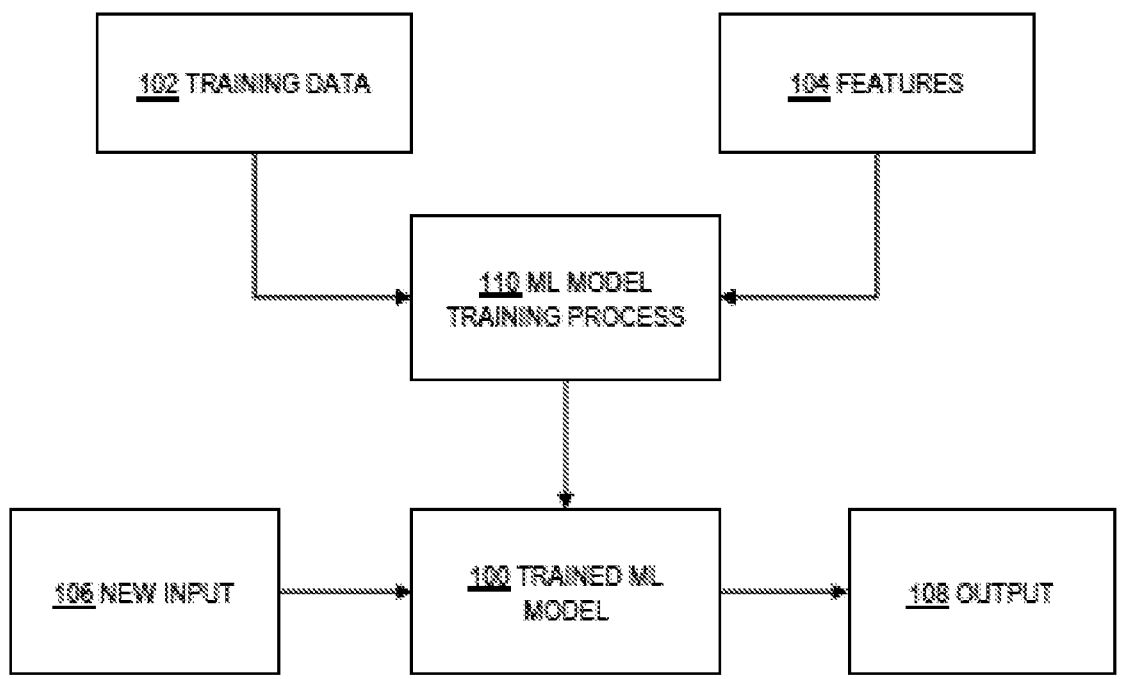
FIG. 5 is a flow chart depicting aspects of the training and usage of a machine learning model suitable for use with aspects of the present disclosure.
Figure 6:
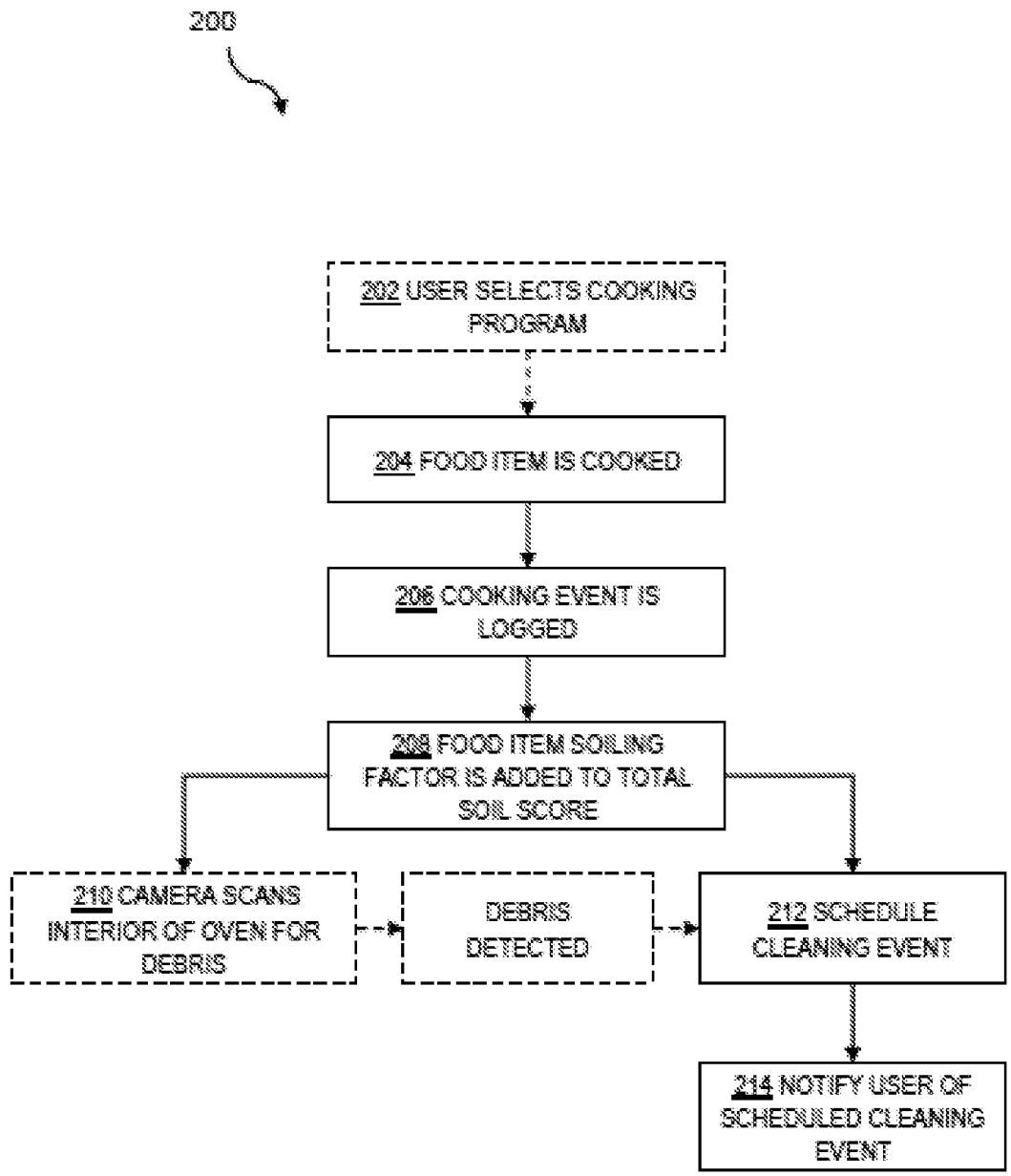
FIG. 6 is a flow chart depicting steps of an illustrative method for autonomously determining and scheduling a cleaning event.

FIG. 5 depicts the training and use of an illustrative machine learning algorithm or model 68 describe above. As discussed herein, one or more machine learning algorithms may be utilized in one or more aspects of cleaning system 10 (and/or other systems described herein).

In general, machine learning (ML) models (AKA ML algorithms, ML tools, or ML programs) may be utilized to generate predictions or decisions that are useful in themselves and/or in the service of a more comprehensive program. ML algorithms "learn" by example, based on existing sample data, and generate a trained model. Using the trained model, predictions or decisions can then be made regarding new data without explicit programming. Machine learning therefore involves algorithms or tools that learn from existing data and make predictions about novel data.

Training data 102 (e.g., labeled training data) is utilized to build trained ML model 100, such that the ML model can produce a desired output 108 when presented with new input data 106. In general, the ML model uses labeled training data 102, which includes values for the input variables and values for the known correct outputs, to ascertain relationships and correlations between variables or features 104 to produce an algorithm mapping the input values to the outputs.

Supervised learning methods may be utilized for the purposes of producing classification or regression algorithms. Classification algorithms are typically used in situations where the goal is categorization (e.g., whether a photo contains a cat or a dog). Regression algorithms are typically used in situations where the goal is a numerical value (e.g., the market value of a house).

Features 104 may include any suitable characteristics capable of being measured and configured to provide some level of information regarding the input scenario, situation, or phenomenon. For example, if the goal is to provide an output relating to the market value of a house, then the features may include variables such as square footage, postal code, year built, lot size, number of bedrooms, etc. Although these example features are numeric, other feature types may be included, such as strings, Boolean values, etc. In the current example, features 104 include information relating to the duration of individual cleaning programs 72, as well as any cooling down period needed by the oven after a clean program finishes.

Different ML techniques may be used, depending on the application. For example, artificial neural networks, decision trees, support-vector machines, regression analysis, Bayesian networks, genetic algorithms, random forests, and/or the like may be utilized to produce the trained ML model.

Trained ML model 100 is produced by training process 110 based on identified features 104 and training data 102. Trained ML model 100 can then be utilized to predict a category or decide an output value 108 based on new input data 106.

With respect to the present disclosure, autonomous self-cleaning system 10 utilizes a trained machine-learning model 68 to predict periods of time in which a cleaning event may occur without conflicting with a user's normal usage of the oven and/or kitchen. Trained machine-learning model 68 utilizes data collected from the user's mobile device such as a personal calendar, as well as the schedule of observed user usage produced by monitoring program 72 to predict when a user is least likely to use their oven and/or kitchen. Other ML models may be utilized by the system to perform tasks such as oven-cavity image analysis for object recognition and/or soiling level estimation.

In the current example, cleaning system 10 is configured to autonomously schedule a requested cleaning event to occur during the period of time determined most suitable by machine-learning module 68. Furthermore, cleaning system 10 is configured to, at the time of the scheduled event, autonomously initiate and perform the cleaning event to completion. In a situation in which all aspects of cleaning system 10 are in appropriate order, such that the cleaning system can proceed at every check point and safety measure, cleaning system 10 may schedule, initiate, and complete a cleaning event without any help or input from the user.

B. Illustrative Method of Autonomously Determining a Soiling Level and Scheduling a Cleaning Event Using a Machine Leaning Model This section describes steps of an illustrative method 200 for autonomously determining whether oven cleaning is recommended, and scheduling a cleaning event to occur utilizing a machine learning model; see FIG. 4. Aspects of autonomous self-cleaning system 10 may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 200 are described below and depicted in FIG. 4, the steps need not necessarily all be performed, and in some cases may be performed simultaneously or in a different order than the order shown.

Step 202 of method 200 is an optional step and includes accessing a plurality of cooking programs either located in a memory of the oven or on a network in communication with the oven and selecting the program for a particular food item. Cooking programs include a variety of information including estimated cooking time, target interior temperature of a food item, appropriate cooking methods, estimated soiling factor and other important information relating to the food item. The soiling factor being a numerical value representing an estimated likelihood of the soiling of the oven interior based on the food item and cooking method.

Step 204 of method 200 includes using components of the oven to cook the food item in accordance with the information supplied from the selected cooking program. Once the food item is cooked and/or a cooking program comes to completion, a user removes the food item from the oven cavity and allows the oven to cool.

Step 206 of method 200 includes logging the cooking event in the schedule of observed oven usage. Logging the cooking event includes collecting information about the time and date of oven usage as well as the duration of the cooking event and the user's presence in the kitchen, e.g., using a presence detection device. In some examples, this step (additionally or alternatively) includes logging the cooking event toward a total number of cooking events to determine if oven cleaning is advisable based on the cumulative number of cooking events that have occurred since a last cleaning event. In such examples, the total number of cooking events has a threshold associated with a need to clean the oven interior, such that when the total number of cooking events reaches or exceeds the predetermined threshold, a cleaning event is scheduled by the cleaning system. In some examples, this step (additionally or alternatively) includes adding a numerical value representing the duration of the cooking event to a total amount of cooking time accumulated between cleaning events. The total amount of cooking time has a threshold associated with recommending a cleaning of the oven interior.

Step 208 of method 200 includes adding the soiling factor of the cooked food item to a total soiling score to determine whether the oven should be cleaned. The total soiling score is configured to present the predicted total amount of soiling accumulation present in the oven between cleaning events. The total soiling score has a threshold associated with a need to clean the oven interior, such that when the total soiling score reaches or exceeds the predetermined threshold a cleaning event is scheduled by the cleaning system. In some examples, when the total soiling score reaches or exceeds the predetermined threshold, the system will utilize a machine learning model to schedule a cooking event to occur during a period of time when the oven is not normally used. Alternatively, when the total soiling score remains below the threshold, a soiling counter disposed on the exterior of the oven may be updated to reflect the current total soiling score.

Step 210 of method 200 is optional and includes utilizing the image sensor and processing logic of the system (e.g., one or more ML models) to analyze the oven cavity for debris, e.g., when the total soiling score fails to meet the threshold. This post-cooking event scan is configured to visually identify any significant soiling (e.g., spills or splatters) in the oven cavity, despite the total soiling score. In some examples, this step includes utilizing an electrical resistance sensor configured to detect the electrical resistance of the oven cavity's interior surfaces to determine the presence of debris in the oven cavity. Because the electrical resistance of the oven cavity's interior surfaces is affected by contact with debris, a change in the resistance of the interior surfaces as sensed by the electrical resistance sensor indicates the potential presence of debris. In some examples, this step includes utilizing a device configured to track the effective heating performance of the oven, and to infer the presence of debris within the oven in response to the oven heating performance changing or dipping beneath an expected level.

Step 212 of method 200 includes autonomously scheduling a cleaning event using processing logic of the system (e.g., including a machine learning model). The cleaning event may be autonomously scheduled whenever a selected number of criteria are met, including situations where the total soiling score after being updated reaches or exceeds the threshold and/or situations in which the post-cooking event analysis of the interior surfaces of the oven cavity detects debris. Based on a determination that a cleaning event is advisable, the machine learning model utilizes information about the user's schedule relative to the oven (e.g., presence in the kitchen, oven door opening/closing, heating of the oven, etc. over time) to schedule a cleaning event in a time slot predicted to avoid interfering with the user's normal activity and use of the oven.

Step 214 of method 200 includes notifying the user of the date and time of the scheduled cleaning event. Notifications may be sent to the user's mobile device, smart home hub, and/or presented at the user interface of the oven.

C. Illustrative Method of Autonomously Implementing and Operating a Scheduled Cleaning Event This section describes steps of an illustrative method 400 for autonomously implementing and operating a scheduled cleaning event for an oven of the present disclosure; see FIG. 7. Aspects of autonomous self-cleaning system 10 may be utilized in the method steps described below. Where appropriate, reference may be made to components and systems that may be used in carrying out each step. These references are for illustration, and are not intended to limit the possible ways of carrying out any particular step of the method.

Figure 7:
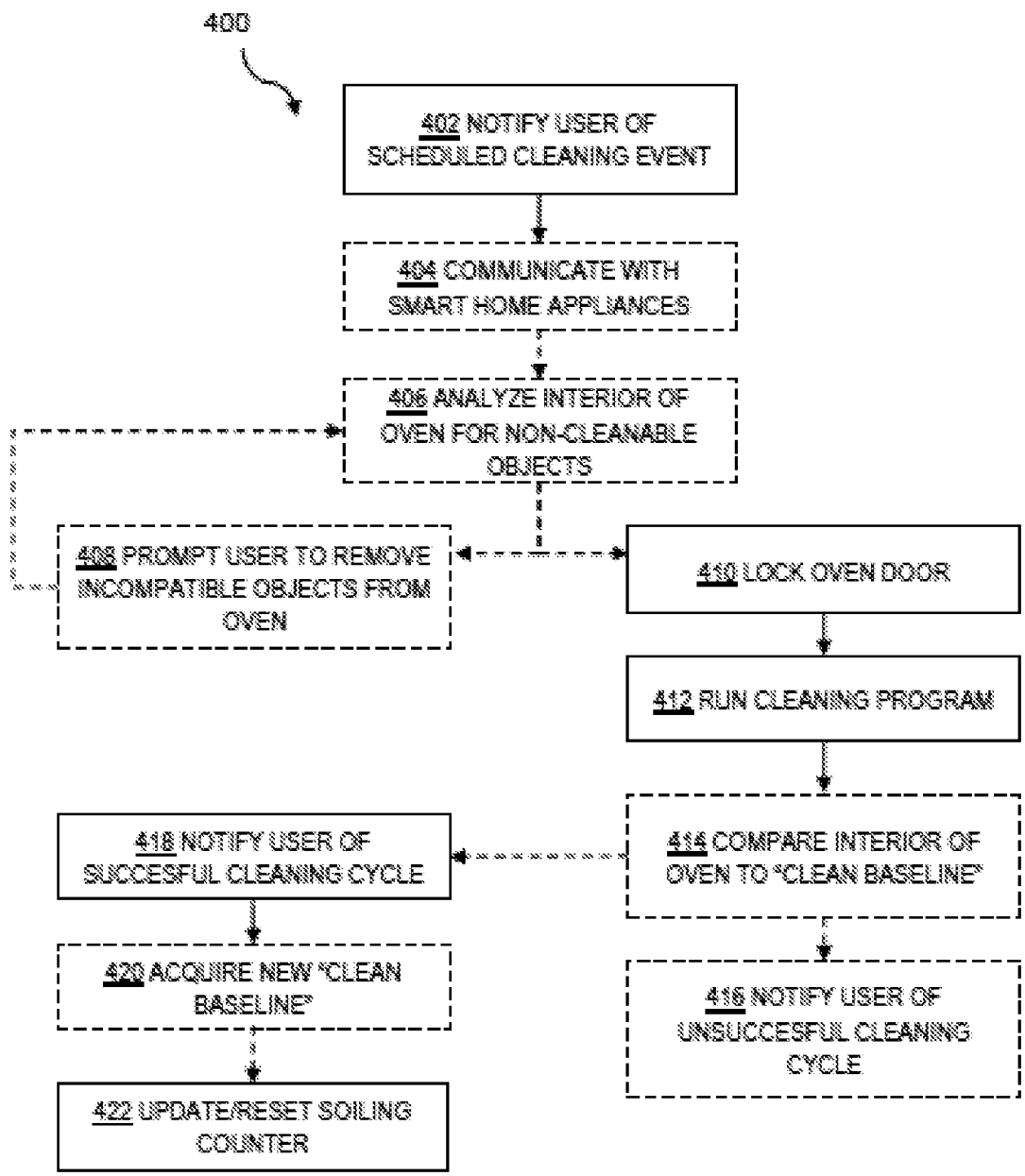
FIG. 7 is a flow chart depicting steps of an illustrative method for autonomously operating a scheduled cleaning event.

FIG. 7 is a flowchart illustrating steps performed in an illustrative method, and may not recite the complete process or all steps of the method. Although various steps of method 400 are described below and depicted in FIG. 7, the steps need not necessarily all be performed, and in some cases may be performed simultaneously or in a different order than the order shown.

Step 402 of method 400 includes receiving a command to begin a scheduled cleaning event, and notifying a user that the scheduled cleaning event will occur momentarily.

Step 404 of method 400 is optional and includes communicating with and activating and/or monitoring smart home appliances also connected to a same network as the oven. Depending on what appliances are used in a house, the cleaning system may be configured to operate or monitor a plurality of windows and/or doors. If a home is equipped with a kitchen ventilation system that is accessible to the cleaning system, the cleaning system may activate the ventilation system before beginning of the scheduled cleaning event to ensure the removal of odors from the kitchen. In some examples where automatically operated doors and/or windows appliances are connected to the network, the cleaning system may automatically open a household window and/or close a kitchen door.

Step 406 of method 400 is optional and includes performing a safety analysis of the oven cavity using an imaging system of the oven, this safety scan being configured to detect and identify any objects present within the oven cavity that are incompatible with the scheduled cleaning event (e.g., due to high temperature and/or substances used).

Step 408 of method 400 is optional and includes sending a notification to a user prompting the removal of any objects detected within the oven cavity and deemed incompatible with a selected cleaning program of the cleaning event. When the objects are removed from the oven cavity the system will again analyze images of the cavity for any remaining items of concern.

Step 410 of method 400 includes locking the oven door, either upon initiation of the cleaning event or when no incompatible objects are detected in the oven cavity. Locking the oven door is a safety measure implemented by the system to ensure that the cleaning event is not interrupted, and also to prevent injury due to the high temperatures that some cleaning programs utilize.

Step 412 of method 400 includes running the cleaning program of the scheduled cleaning event to completion. When the cleaning event is completed, the oven door is unlocked, allowing the user to once again access the oven cavity.

Step 414 of method 400 is optional and includes performing an after-event image analysis of the oven cavity and comparing the after-event images to a clean baseline scan of the oven cavity.

Step 416 of method 400 is optional and includes notifying the user of an unsuccessful cleaning event based on the after-event image analysis of the oven cavity. A failed analysis represents an additional need for cleaning of the oven cavity, and may result in the scheduling of another cleaning event.

Step 418 of method 400 includes notifying the user of a successful cleaning event following the completion of the cleaning program or when the after-event analysis of the oven cavity passes. A passing scan analysis means that the interior of the oven cavity after the cleaning event is in the same general condition as the interior of the oven after a known successful cleaning event.

Step 420 of method 400 is optional and includes acquiring a new clean baseline imaging scan of the interior surfaces of the oven cavity for use with the next cleaning event.

Step 422 of method 400 includes updating a soiling counter to display a total soiling score to the user. When a cleaning event is successful the total soiling score is reset to zero and the soiling counter is updated to reflect the reset.

E. Illustrative Combinations and Additional Examples

This section describes additional aspects and features of an autonomous self-cleaning system, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for cleaning an oven, the method comprising:
automatically scheduling a cleaning event to occur during a period of user inactivity, by an electronic controller of an oven, based on an estimated cumulative soiling level and a predicted period of user inactivity, wherein the cleaning event comprises one or more automatic activities configured to clean an interior cavity of the oven;
notifying a user of the scheduled cleaning event; and
executing the cleaning event automatically.

A1. The method of A0, wherein notifying the user comprises displaying a human-readable message on a display of the oven.

A2. The method of A0 or A1, wherein notifying the user comprises sending a message to a mobile electronic device of the user.

A3. The method of anyone of A0 through A2, wherein notifying the user comprises sending a message to a smart home hub of the user.

A4. The method of any one of A0 through A3, wherein the cleaning event comprises a pyrolytic cleaning of the interior cavity of the oven.

A5. The method of any one of A0 through A4, wherein the cleaning event comprises steam cleaning.

A6. The method of any one of A0 through A5, further comprising:
collecting user activity data by tracking user activity relative to the oven based on presence detection and oven usage information; and
predicting one or more periods of user inactivity with respect to the oven, using processing logic of the electronic controller.

A7. The method of A6, wherein the processing logic includes a machine learning model trained to predict the one or more periods of user inactivity based on the user activity data.

A8. The method of any one of A0 through A7, further comprising determining the estimated cumulative soiling level by:
associating a respective soiling factor to each event of oven usage, and
aggregating the soiling factors of the events of oven usage occurring over a period of time.

A9. The method of A8, further comprising displaying the estimated cumulative soiling level on a display of the oven.

A10. The method of A9, wherein the estimated cumulative soiling level is a numerical score.

A11. The method of any one of A0 through A10, wherein the step of automatically scheduling the cleaning event is triggered in response to the estimated cumulative soiling level reaching a threshold value.

B0. A method for cleaning an oven, the method comprising:
automatically scheduling a cleaning event to occur during a period of user inactivity, by an electronic controller of an oven, based on an accumulated total cooking time and a predicted period of user inactivity, wherein the cleaning event comprises one or more automatic activities configured to clean an interior cavity of the oven;
notifying a user of the scheduled cleaning event; and
executing the cleaning event automatically.

B1. The method of B0, wherein notifying the user comprises displaying a human-readable message on a display of the oven.

B2. The method of B0 or B1, wherein notifying the user comprises sending a message to a mobile electronic device of the user.

B3. The method of B0, B1 or B2, wherein notifying the user comprises sending a message to a smart home hub of the user.

B4. The method of any one of B0 through B3, wherein the cleaning event comprises a pyrolytic cleaning of the interior cavity of the oven.

B5. The method of any one of B0 through B4, wherein the cleaning event comprises steam cleaning.

B6. The method of any one of B0 through B5, further comprising:
collecting user activity data by tracking user activity relative to the oven based on presence detection and oven usage information; and
predicting one or more periods of user inactivity with respect to the oven, using processing logic of the electronic controller.

B7. The method of B6, wherein the processing logic includes a machine learning model trained to predict the one or more periods of user inactivity based on the user activity data.

B8. The method of any one of B0 through B7, further comprising calculating the accumulated total cooking time between cleaning events by:
recording a total cooking time of each observed cooking event following a last cleaning event, and
adding the recorded total cooking time to the accumulated total cooking time of cooking events since the last cleaning event.

B9. The method of any one of B0 through B8, wherein the step of automatically scheduling the cleaning event is triggered in response to the accumulated total cooking time reaching a threshold value.

C0. A method for cleaning an oven, the method comprising:
automatically scheduling a cleaning event to occur during a period of user inactivity, by an electronic controller of an oven, based on a total number of cooking events and a predicted period of user inactivity, wherein the cleaning event comprises one or more automatic activities configured to clean an interior cavity of the oven;

notifying a user of the scheduled cleaning event; and executing the cleaning event automatically.

C1. The method of C0, wherein notifying the user comprises displaying a human-readable message on a display of the oven.

C2. The method of C0 or C1, wherein notifying the user comprises sending a message to a mobile electronic device of the user.

C3. The method of C0, C1 or C2, wherein notifying the user comprises sending a message to a smart home hub of the user.

C4. The method of any one of C0 through C3, wherein the cleaning event comprises a pyrolytic cleaning of the interior cavity of the oven.

C5. The method of any one of C0 through C4, wherein the cleaning event comprises steam cleaning.

C6. The method of any one of C0 through C5, further comprising:

collecting user activity data by tracking user activity relative to the oven based on presence detection and oven usage information; and predicting one or more periods of user inactivity with respect to the oven, using processing logic of the electronic controller.

C7. The method of C6, wherein the processing logic includes a machine learning model trained to predict the one or more periods of user inactivity based on the user activity data.

C8. The method of any one of C0 through C7, further comprising calculating the total number of cooking events that have occurred since a last cleaning event by:

resetting the total number of cooking events to zero after a successful cleaning event, and adding an observed cooking event to the total number of cooking events, after the completion of each cooking event.

C9. The method of C8, wherein the total number of cooking events is a numerical score.

C10. The method of any one of C0 through C9, wherein the step of automatically scheduling the cleaning event is triggered in response to the total number of cooking events reaching a threshold value.

D0. A method for safe implementation of a scheduled cleaning event by an autonomous self-cleaning system, the method comprising:

detecting a presence of any non-cleanable objects in the oven cavity, prior to the start of a cleaning program, prompting a user to empty oven cavity when any non-cleanable objects are detected, and postponing the scheduled cleaning event.

D1. The method of D0, further comprising engaging a door locking mechanism disposed within the oven when no non-cleanable objects are detected within the oven cavity, wherein the door locking mechanism is configured to securely couple an oven door to a front of the oven cavity before beginning a cleaning program.

D2. The method of D0 or D1, further comprising communicating with a plurality of household appliances using a network, so as to increase ventilation of an area in which the oven is located.

D3. The method of D2, wherein the plurality of household appliances includes a smart window monitoring system.

D4. The method of D2, wherein the plurality of household appliances includes a smart door monitoring system D5. The method of D2, wherein the plurality of household appliances includes a window operating system D6. The method of D2, wherein the plurality of household appliances includes a door operating system D7. The method of D2, wherein the plurality of household appliances includes a smart window monitoring system D8. The method of D2, wherein the plurality of household appliances includes a kitchen ventilation system D9. The method of D8, wherein the kitchen ventilation system is accessible and operable via the network D10. The method of any one of D0 through D9, further comprising detecting the presence of any non-cleanable objects in the oven cavity by:

taking a scan of the oven cavity, and inputting the scan into an image analyzer configured to detect objects having characteristics deemed non-cleanable by the system.

D11. The method of D10, wherein the scan is achieved using an imaging device disposed within the oven cavity.

D12. The method of any one of D0 through D11, wherein postponing the scheduled cleaning event further includes rescheduling the cleaning event.

E0. An autonomous self-cleaning oven, comprising:

an oven body having an oven cavity configured to be selectively heated by one or more heating elements;

an electronic controller configured to control the one or more heating elements and having processing logic configured to:

track an estimated cumulative soiling level of the oven cavity;

automatically schedule an oven cleaning event to occur during a period of user inactivity, based on the estimated cumulative soiling level and a predicted period of user inactivity;

notify the user of the scheduled cleaning event; and automatically execute the cleaning event.

E1. The oven of E0, wherein notifying the user comprises displaying a human-readable message on a display of the oven.

E2. The oven of E0 or E1, wherein notifying the user comprises sending a message to a mobile electronic device of the user.

E3. The oven of any one of paragraphs E0 through E2, wherein the cleaning event comprises a pyrolytic cleaning of the cavity of the oven, using the one or more heating elements.

E4. The oven of any one of paragraphs E0 through E3, wherein the cleaning event comprises a steam cleaning of the cavity of the oven.

E5. The oven of any one of paragraphs E0 through E4, wherein the processing logic of the electronic controller is further configured to:

collect user activity data by tracking user activity relative to the oven based on presence detection and oven usage information; and predict one or more periods of user inactivity with respect to the oven.

E6. The oven of E5, wherein the processing logic includes a machine learning model trained to predict the one or more periods of user inactivity based on the user activity data.

E7. The oven of any one of paragraphs E0 through E6, wherein the processing logic of the electronic controller is further configured to track the estimated cumulative soiling level by:

associating a respective soiling factor to each event of oven usage; and aggregating the soiling factors of the events of oven usage occurring over a period of time.

E8. The oven of E7, further comprising displaying the estimated cumulative soiling level on a display of the oven.

E9. The oven of any one of paragraphs E0 through E8, wherein automatically scheduling the cleaning event is triggered in response to the estimated cumulative soiling level reaching a threshold value.

Advantages, Features, and Benefits

The different embodiments and examples of the autonomous self-cleaning system described herein provide several advantages over known solutions for incorporating the cleaning of an over cavity into a daily routine. For example, illustrative embodiments and examples described herein allow for convenient and frequent (e.g., daily) self-cleaning of an oven cavity.

Additionally, and among other benefits, illustrative embodiments and examples described herein allow a completely autonomous self-cleaning system which can determine when an oven needs to be cleaned without user input.

Additionally, and among other benefits, illustrative embodiments and examples described herein allow for autonomous scheduling of an oven cleaning event avoiding interference with a user's normal usage of an oven and/or the space nearby (e.g., the kitchen).

Additionally, and among other benefits, illustrative embodiments and examples described herein allow autonomous activation and monitoring of a cleaning event.

Additionally, and among other benefits, illustrative embodiments and examples described herein provide a consistently clean oven interior without the need for manual labor or supervision.

Additionally, and among other benefits, illustrative embodiments and examples described herein provide a convenient alternative to manually scheduled and initiated self-cleaning of an oven by allowing the user to rely on a self-cleaning system configured to autonomously schedule and execute cleaning events around the user's schedule.

Additionally, and among other benefits, illustrative embodiments and examples described herein allow for an autonomous self-cleaning system which requires no input or intervention from the user to operate, such that the user does not need to be present during the scheduling or initiation of a cleaning event.

Additionally, and among other benefits, illustrative embodiments and examples described herein provide a connection to various household appliances, and the connection can be used to autonomously control the activation of a ventilation system and/or the opening of a door and/or window during a cleaning event, so as to release any negatively perceived odors created during the cleaning event from a kitchen and/or area in which an oven is located. This increases safety and reduces inconvenience.

Additionally, and among other benefits, illustrative embodiments and examples described herein allow the duration of a cleaning event to occur within a scheduled time period that does not interfere with a user's normal usage of the oven.

Additionally, and among other benefits, illustrative embodiments and examples described herein provide safety features configured to ensure that no non-compatible objects are left within the oven cavity during a cleaning event, so as to avoid odors and reduce the risk of damage to the objects and/or oven.

Additionally, and among other benefits, illustrative embodiments and examples described herein provide an autonomous self-cleaning system which reduces the possibility of human error when determining soiling accumulation, by making the scheduling and oven cleaning an automated task handled by the appliance.

Additionally, and among other benefits, illustrative embodiments and examples described herein allow an oven to maintain expected oven performance levels, because by incorporating regular oven cleaning into a routine, the oven cavity surfaces are less likely to accumulate soiling over time and more likely to maintain a good operational state.

Additionally, and among other benefits, illustrative embodiments and examples described herein provide a user with a clean oven without the need for the user to remember to schedule or execute a cleaning event, by autonomously scheduling and initiating cleaning events.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for cleaning an oven, the method comprising:
predicting one or more predicted periods of user inactivity with respect to the oven, using processing logic of an electronic controller of the oven;
tracking an estimated cumulative soiling level within the oven over a period of time without user input, using the electronic controller, wherein the period of time includes a plurality of cooking events performed by the oven;
automatically scheduling a cleaning event to occur at a scheduled time without user input, wherein the scheduled time is during the one or more predicted periods of user inactivity, wherein the automatically scheduling the cleaning event is performed by the electronic controller;
wherein the automatically scheduling the cleaning event is automatically triggered without user input in response to the estimated cumulative soiling level within the oven exceeding a predetermined threshold, as determined during the tracking the estimated cumulative soiling level within the oven over the period of time, wherein the cleaning event comprises one or more automatic activities configured to clean an interior cavity of the oven;

notifying a user of the time and date of the scheduled cleaning event, by the electronic controller, prior to the scheduled time; and executing the cleaning event automatically at the scheduled time during the one or more predicted periods of user inactivity, without user input.

2. The method of claim 1, wherein notifying the user comprises displaying a human-readable message on a display of the oven.

3. The method of claim 1, wherein notifying the user comprises sending a message to a mobile electronic device of the user.

4. The method of claim 1, wherein the cleaning event comprises a pyrolytic cleaning of the interior cavity of the oven.

5. The method of claim 1, wherein the cleaning event comprises a steam cleaning of the interior cavity of the oven.

6. The method of claim 1, further comprising:
collecting user activity data by tracking user activity relative to the oven based on presence detection and oven usage information.

7. The method of claim 6, wherein the processing logic includes a machine learning model trained to predict the one or more predicted periods of user inactivity based on the user activity data.

8. The method of claim 1, wherein tracking the estimated cumulative soiling level comprises:
associating a respective soiling factor to each event of oven usage; and
aggregating the soiling factors of the events of oven usage occurring over a period of time.

9. The method of claim 8, further comprising displaying the estimated cumulative soiling level on a display of the oven.

10. The method of claim 1, wherein notifying the user of the scheduled cleaning event is performed prior to executing the cleaning event.

11. The method of claim 1, wherein tracking the estimated cumulative soiling level within the oven comprises:
scanning an interior surface of the oven using an imaging device, wherein scanning the interior surface of the oven is performed after an initial cleaning event to produce a baseline image;
scanning the interior surface of the oven using the imaging device after each respective cooking event of the plurality of cooking events to produce a respective post-event image after each respective cooking event;
comparing each respective post-event image with the baseline image; and
sending information relating to comparing each respective post-event image with the baseline image to the electronic controller.

12. An autonomous self-cleaning oven, comprising:
an oven body having an oven cavity configured to be selectively heated by one or more heating elements;
an electronic controller configured to control the one or more heating elements and having processing logic configured to:
track an estimated cumulative soiling level of the oven cavity during a plurality of cooking events without user input;
predict one or more predicted periods of user inactivity;
determine when the estimated cumulative soiling level exceeds a predetermined threshold;
automatically schedule an oven cleaning event to occur at a scheduled time without user input, wherein the scheduled time is during the one or more predicted periods of user inactivity, in response to the estimated cumulative soiling level exceeding the predetermined threshold;
notify the user of the time and date of the scheduled cleaning event prior to the scheduled time; and
automatically execute the cleaning event at the scheduled time during the one or more predicted periods of user inactivity, without user input.

13. The oven of claim 12, wherein notifying the user comprises displaying a human-readable message on a display of the oven.

14. The oven of claim 12, wherein notifying the user comprises sending a message to a mobile electronic device of the user.

15. The oven of claim 12, wherein the cleaning event comprises a pyrolytic cleaning of the cavity of the oven, using the one or more heating elements.

16. The oven of claim 12, wherein the cleaning event comprises a steam cleaning of the cavity of the oven.

17. The oven of claim 12, wherein the processing logic of the electronic controller is further configured to:
collect user activity data by tracking user activity relative to the oven based on presence detection and oven usage information.

18. The oven of claim 17, wherein the processing logic includes a machine learning model trained to predict the one or more predicted periods of user inactivity based on the user activity data.

19. The oven of claim 12, wherein the processing logic of the electronic controller is further configured to track the estimated cumulative soiling level by:
associating a respective soiling factor to each event of oven usage; and
aggregating the soiling factors of the events of oven usage occurring over a period of time.

20. The oven of claim 19, further comprising displaying the estimated cumulative soiling level on a display of the oven.

21. The oven of claim 12, further comprising a soiling detection device configured to determine an amount of soiling accumulated within the oven cavity between cleanings, such that data from the soiling detection device is used by the processing logic to track the estimated cumulative soiling level of the oven cavity.

* * * * *